INVENTOR
RICHARD C. BUELER
BY
Joseph E. Papin

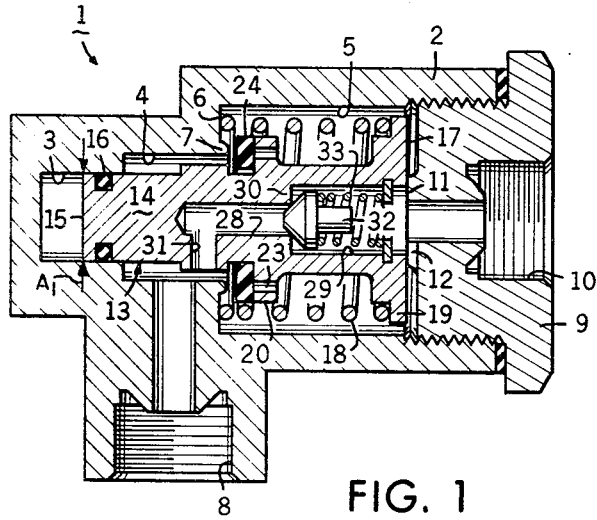

United States Patent Office 3,508,792
Patented Apr. 28, 1970

3,508,792
CONTROL VALVE
Richard C. Bueler, Glendale, Mo., assignor to Wagner Electric Corporation, Newark, N.J., a corporation of Delaware
Filed Apr. 25, 1968, Ser. No. 724,198
Int. Cl. B60t 8/26, 8/18
U.S. Cl. 303—6                         13 Claims

ABSTRACT OF THE DISCLOSURE

A proportioning valve for effecting an applied fluid pressure in a predetermined ratio with fluid pressure supplied thereto in excess of a predetermined value and responsive to another predetermined value of the supplied fluid pressure greater than the first named predetermined value to effect an applied fluid pressure in substantially a 1:1 ratio therewith.

---

This inventon relates to control valves and in particular to proportioning valves for effecting a proportional application of fluid pressure supplied thereto.

In the past, proportioning valves were provided in vehicle brake systems to effect a reduced proportional application to one of the vehicle front and rear brake motors of the fluid pressure supplied thereto from the master cylinder when the supplied fluid pressure exceeded a predetermined value; however, one of the disadvantageous or undesriable features of such past proportioning valves was that they continued to proportionally reduce the applied fluid pressure throughout the entire range of the braking effort, whereas during an intense braking effort at a relatively high supplied fluid pressure it is advantageous to apply the maximum available fluid pressure in the system to both the front and rear vehicle brake motors.

The principal object of the present invention is to provide a control valve which overcomes the aforementioned disadvantageous or undesirable feature, and this, as well as other objects and advantageous features of the present invention, will become apparent from the specification which follows.

Briefly, the present invention embodies a control valve having resiliently urged means responsive to supplied fluid pressure less than a predetermined value to effect an applied fluid pressure in a predetermined ratio therewith and movable in response to the supplied fluid pressure in excess of the predetermined value and less than another predetermined value predeterminately greater than the first named predetermined value to effect a metered increase in the applied fluid pressure in another predetermined ratio therewith different than the first named predetermined ratio, and other means movable in response to the supplied fluid pressure in excess of the other predetermined value to effect further increases in the applied fluid pressure in the first named ratio.

In the drawings wherein like numerals refer to like parts wherever they occur:

FIG. 1 is a sectional view illustrating a control valve embodying the present invention in cross-section;

FIG. 2 is an enlarged fragmentary sectional view taken from FIG. 1 also in cross-section;

FIG. 3 is a graphical representation illustrating a comparison of the input and output fluid pressures of the control valve of FIG. 1;

FIG. 4 is another fragmentary sectional view taken from FIG. 1 illustrating another control valve similar to the control valve of FIG. 1 also embodying the present invention in cross-section;

FIG. 5 is a graphical representation illustrating a comparison of the input and output fluid pressures of the control valve of FIG. 4;

Figure 6:
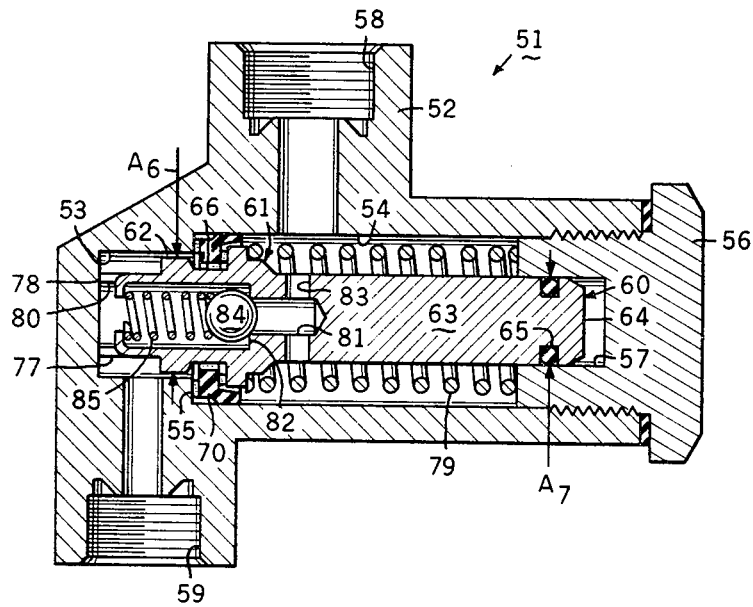
FIG. 6 is a sectional view illustrating another control valve embodying the present invention in cross-section.

Referring now to the drawings and in particular to FIGS. 1 and 2, a control or proportioning valve, indicated generally at 1, is provided with a housing 2 having a bore 3 therein connected with a pair of stepped counterbores 4, 5, and a shoulder 6 is defined on the housing 2 at the juncture of said counterbores, said shoulder having a valve seat 7 defined thereon in circumscribing relation with the counterbore 4 and facing the counterbore 5. An inlet port 8 which is adapted for connection with a master cylinder (not shown) is provided in the housing 2 intersecting with the counterbore 4, and an end plug or closure member 9 is threadedly received in the open or rightward end of the counterbore 5 defining an end wall thereof. An outlet port 10 which is adapted for connection with a brake motor (not shown) is provided coaxially through the closure member 9 connecting with the counterbore 5, and an abutment surface 11 is provided on the interior end of the closure member about said outlet port, said abutment surface having a plurality of radially extending slots 12 therein connecting with said outlet port.

A metering or proportioning member, such as the piston indicated generally at 13, is provided with a body 14 which extends coaxially through the counterbore 4 having a leftward end portion 15 with a peripheral seal 16 disposed therein in sliding engagement with the bore 3 and a rightward end portion 17 in the counterbore 5 normally urged into engagement with the closure member abutment surface 11 by the compressive force of a proportioning or metering spring 18 interposed between the housing shoulder 6 and a radially extending flange 19 provided on said rightward end of said piston body. Another radially extening or valve seating flange 20 is provided on the piston body 14 adjacent to the central portion thereof having opposed annular faces or surfaces 21, 22, and a plurality of return flow passages 23 are axially provided through said flange between said opposed faces thereof. An annular valve member or element 24 is provided with a centrally located aperture 25 therethrough which is slidably received on the piston body 14. The valve member 24 is normally positioned against the flange face 21 having a radially outer portion 26 for sealing engagement with the housing valve seat 7 and a radially inner portion 27 adjacent to the aperture 25 defining a uni-directional or check valve which is normally sealably engaged with said flange face about the return flow passages 23.

Stepped bores or passages 28, 29 having an annular shoulder 30 defining a valve seat therebetween are provided in the piston body 14, and a cross-passage 31 has one end intersecting with the stepped passage 28 while the other end thereof is connected in pressure fluid communication with the inlet port 8, said stepped passage 29 intersecting the righward end 17 of the piston body 14 and being in open pressure fluid communication with the outlet port 10. A metering or valve member 32 is normally urged into engagement with the piston valve seat 30 by the compressive force of a metering spring 33 interposed between said valve member and a retainer 34 provided in the rightward end of the piston stepped passage 29.

It should be noted that the piston 13 is provided with an annular effective area $A_1$ generally defined by the effective cross-sectional sealing area of the piston seal 16 with the housing bore 3 subjected to the atmosphere in said housing bore. Another effective area $A_0$ is provided on the piston 13 for subjection to the fluid pressure at the outlet port 8 when the valve member 24 is disengaged from the valve seat 7, said area $A_0$ being opposed to and greater than the area $A_1$. Another area $A_2$ is responsive to the fluid pressure at the outlet port 12 when the valve member 24 is engaged with the seat 7 and is generally defined by the sealing engagement of the valve element 24 with the housing valve seat 7, said area $A_2$ also being opposed to and predeterminately greater than the area $A_1$. To complete the description of the control valve 1, it should also be noted that the valve member 32 is provided with opposed substantially equal input and output effective areas $A_3$, $A_4$ generally defined by the seating engagement of said valve member with the piston valve seat 30 and respectively responsive to the fluid pressures at the inlet and outlet ports 8, 10.

In the operation with the component parts of the control valve 1 in their inoperative or normal positions, as shown, input fluid pressure $P_1$ supplied to the inlet port 8 from the master cylinder (not shown) flows through the housing counterbores 4, 5 and the closure member slots 12 to establish an applied or output fluid pressure $P_2$ at the outlet port 10 in a predetermined 1:1 ratio with the input fluid pressure $P_1$, as shown along the line OB in the graph of FIG. 3. The output fluid pressure acts on the difference between the effective areas $A_1$, $A_0$ of the piston 13 to establish an output force $P_2$ $(A_0-A_1)$ urging said piston leftwardly against the compressive force $Fs$ of the metering spring 18, and when the input and output fluid pressures $P_1$, $P_2$ are increased to the predetermined value B, as shown in the graph of FIG. 3, the output force $P_2(A_0-A_1)$ moves the piston 13 leftwardly toward an isolating position engaging the valve member 24 with the housing valve seat 7 to isolate the input fluid pressure $P_1$ from the output fluid pressure $P_2$ and interrupt pressure fluid communication between the inlet and outlet ports 8, 10. With the valve member engaged with the housing valve seat 7, the output fluid pressure now acts on the effective area $A_2$ to establish another output force $P_2A_2$ which replaces the output force $P_2$ $(A_2-A_1)$, and the input fluid pressure $P_1$ acts on the effective area $(A_2-A_1)$ to establish an input force $P_1$ $(A_2-A_1)$ which is additive to the spring force $Fs$ and opposed to the output force $P_2A_2$. When the input fluid pressure $P_1$ is increased along the line OC in the graph of FIG. 3 to values in excess of the predetermined value B but less than the predetermined value E, the increased input force $P_1$ $(A_2-A_1)$ assisted by the spring force $Fs$ urges the piston 13 rightwardly toward a metering position against the opposing output force $P_2A_2$. This rightward movement of the piston 13 disengages the valve member 24 from the housing valve seat 7 to establish metered pressure fluid communication between the inlet and outlet ports 8, 10 and effect a metered increase in the output fluid pressure $P_2$ in another predetermined ratio with the input fluid pressure $P_1$ between the predetermined values B and E, as shown along the line BD in the graph of FIG. 3, said other ratio being defined by the following equation:

$$P_2 = \frac{P_1(A_2-A_1)+Fs}{A_2}$$

The proportional increase in the output fluid pressure $P_2$ effects a corresponding increase in the output force $P_2A_2$, and when the increased output force $P_2A_2$ attains a value substantially equal to the opposing increased input force $P_1(A_2-A_1)$ and the additive spring force $Fs$, the piston 13 is again moved leftwardly to its isolating or interrupting position re-engaging the valve element 24 with the housing valve seat 7 to again interrupt pressure fluid communication between the inlet and outlet ports 8, 10.

The input fluid pressure $P_1$ also flows through the cross-passage 31 and stepped passage 28 of the piston body 14 acting on the input area $A_3$ of the valve member 32 to establish an input force $P_1A_3$, and the output fluid pressure $P_2$ also flows into the stepped passage 29 of said piston body acting on the output area $A_4$ of said valve member to establish an output force $P_2A_4$ which is opposed to the input force $P_1A_3$ and additive to the compressive force $Fc$ of the spring 33. When the input fluid pressure is increased along the line OC in the graph of FIG. 3 to values in excess of the predetermined value E, the increased input force $P_1A_3$ urges the valve member 32 rightwardly against the additive output and spring forces $P_2A_4$ and $Fc$ toward a metering position disengaged from the piston valve seat 30 to establish metered pressure fluid communication between the inlet and outlet ports 8, 10 through the stepped passages 28, 29 when the piston 13 is in its isolating position. In this manner, the output fluid pressure $P_2$ is increased, as shown along the line DF in the graph of FIG. 3, in a predetermined 1:1 ratio with the input fluid pressure $P_1$ in excess of the predetermined value E, said predetermined ratio being illustrated by the following equation:

$$P_2 = \frac{P_1A_3-Fc}{A_2}$$

This proportional increase in the output fluid pressure $P_2$ effects a corresponding increase in the output force $P_2A_4$, and when the increased output force $P_2A_4$ attains a value substantially equal to the additive input and spring forces $P_1A_3$ and $Fc$, the valve member 32 is moved leftwardly to its interrupting position re-engaging the piston valve seat 30 to again interrupt pressure fluid communication between the inlet and outlet ports 8, 10.

When the desired braking effort is attained, the master cylinder is de-actuated to eliminate the input fluid pressure $P_1$, and when the input fluid pressure $P_1$ is so decreased along the line OC in the graph of FIG. 3 below the value of the output fluid pressure $P_2$ on the line DF of said graph, a fluid pressure differential is established across the valve member 24 acting to displace the radially inner or check valve portion 27 thereof from engagement with the face 21 of the piston flange 20 thereby permitting the return flow of the displaced output fluid pressure $P_2$ through the piston return flow passages 23 and the valve member central aperture 25 to the inlet port 8. This return flow of the displaced output fluid pressure is illustrated along the line FGB in the graph of FIG. 3. When the input and output fluid pressures $P_1$, $P_2$ are so reduced to a value less than the predetermined value B, the reduced input force $P_1(A_2-A_1)$ and the additive spring force $Fs$ overcomes the reduced output force $P_2A_2$ and moves the piston 13 to its original position with the rightward end 17 of said piston engaged with the closure member abutment 11 and the valve member 24 disengaged from the housing valve seat 7 re-establishing open pressure fluid communication between the inlet and outlet ports 8, 10.

Referring now to FIG. 4, a control valve 41 is shown having the same component parts and functioning in the same manner as the previously described control valve 1 with the following exceptions.

In the control valve 41, a control or air spring port 42 is provided in the housing 2 intersecting with the end wall of the housing bore 3, said control port being adapted for connection with the air spring of a vehicle air suspension system (not shown), and the effective area $A_1$ provided on the leftward end 15 of the piston body 14 is subjected to the control or air spring fluid pressure $P_3$ at control port 42.

In operation of the control valve 41, it is obvious that, in the absence of control fluid pressure $P_3$ at the control port 42, the function of the control valve 41 is the same as that of the previously described control valve 1, as shown in the graph of FIG. 5. When the control fluid pressure $P_3$ is established at the control port 42, it acts on the area $A_1$ to establish a control force $P_3A_1$ which is additive to the input and spring forces $P_1(A_2-A_1)$ and $Fs$ to actuate the piston 13 to its metering position in opposition to the output force $P_2A_2$ and effect a proportional metered increase in the output fluid pressure $P_2$ along one of many incrementally variable lines parallel to the line BD, such as for instance the dashed line B'D' in the graph of FIG. 5, in the following ratio:

$$P_2 = \frac{P_1(A_2-A_1)+P_3A_1+Fs}{A_2}$$

As the vehicle load is further increased, the control fluid pressure $P_3$ also increases to effect an increased control force $P_3A_1$, and such increases in the control force $P_3A_1$ are additive to the input and spring forces $P_1(A_2-A_1)$ and Fs to establish a proportionally increased output fluid pressure $P_2$ in the same manner as described hereinabove and as illustrated, for instance, along the dashed line B"D" in the graph of FIG. 5. From the foregoing, it is obvious that variations in the control fluid pressure $P_3$ not only proportionally alters the output fluid pressure $P_2$ but also alters the selected predetermined value B at which the proportioning function of the control valve 41 occurs, as well as the predetermined values E and D of the input and output fluid pressures $P_1$, $P_2$, respectively, at which said control valve functions to re-establish the 1:1 ratio between said input and output fluid pressures $P_1$, $P_2$. In other words, the output fluid pressure $P_2$ is proportionally variable with the vehicle load condition or magnitude in order to proportionally vary the braking effort of the vehicle with regard to the vehicle load.

Figure 7:
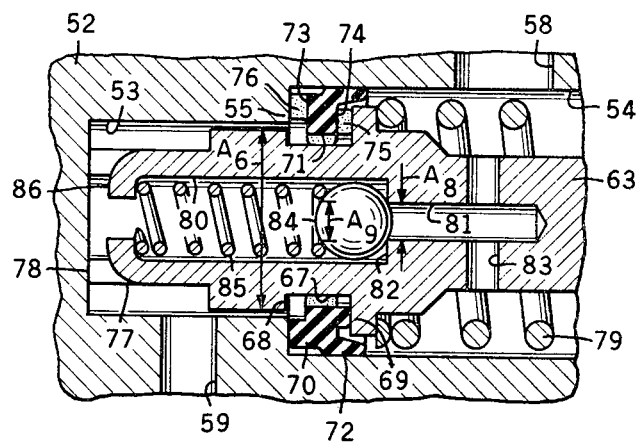
FIG. 7 is an enlarged fragmentary sectional view taken from FIG. 6.

Referring now to FIGS. 6 and 7, another control valve 51 is provided with a housing 52 having a bore 53 therein aligned with a counterbore 54, and a shoulder 55 is provided on said housing at the juncture of said bore and counterbore. A closure member 56 is threadedly received in the rightward or open end of the housing counterbore 54 defining an end wall thereof, and a bore 57 is coaxially provided in said closure member connecting with said counterbore. An inlet port 58 which is adapted for connection with a master cylinder (not shown) is provided in the housing 52 intersecting with the housing bore 53, and an outlet port 59 which is adapted for connection with a vehicle brake motor (not shown) is also provided in said housing intersecting with the housing counterbore 54.

A proportioning or metering member, such as the piston indicated generally at 60, is provided with an enlarged or head portion 61 loosely guided in the housing bore 53 and defining therewith an annular passage 62, and a stem portion 63 is integrally formed with said head portion extending coaxially through the housing counterbore 54 and having a free or rightward end portion 64 slidably received in the closure member bore 57, said free end having a peripheral seal 65 therein in sealing engagement with said closure member bore. A peripheral groove 66 is provided in the piston head 61 having a base wall 67 interposed between opposed side walls 68, 69, and an annular seal or valve member 70 is received in said groove. The valve member 70 is provided with an annular base portion 71 radially spaced from the groove base wall 67, an annular outer seal 72 in sealing engagement with the housing counterbore 54, and opposed faces or sides 73, 74 interconnecting said base portion and lip and opposed to the groove side walls 68, 69, respectively. A plurality of annularly spaced abutments 75, 76 are respectively provided on the opposed faces 73, 74 of the valve member 70 for abutting engagement with the housing shoulder 55 and the groove side wall 69. An extension 77 is integrally formed on the leftward end of the piston head 61 having a free or leftward end 78 normally biased into abutment with the end wall of the housing bore 53 by the force of a proportioning or metering spring 79 which is pre-compressed betwen the piston head 61 and the closure member 56.

Stepped bores or passages 80, 81 having an annular shoulder 82 defining a valve seat therebetween are axially provided in the piston 60, and a cross-passage 83 in the piston stem 63 connects the smaller stepped passage 81 in pressure fluid communication with the inlet port 58 while said larger stepped passage 80 intersects the free ends 78 of the piston extension 77, said larger stepped passage being in open pressure fluid communication with the outlet port 59. A metering or valve member 84 is normally urged into engagement with the piston valve seat 82 by the force of a metering spring 85 precompressed between said valve member and a plurality of retainers or ears 86 which are integrally formed from the piston extension 77 adjacent to the free end 78 thereof.

When the piston free end 78 is biased into engagement with the end wall of the housing bore 53, as shown, the piston 60 is in its inoperative position, and the groove side wall 68 which defines an annular valve seat is spaced from engagement with its cooperating side or face 73 of the valve member 70. The seating engagement of the valve seat 68 with the valve member face 73 defines an effective area $A_6$ on the piston head 61, and the piston stem 63 is provided with another effective area $A_7$ substantially defined by the sealing engagement of the stem seal 65 with the closure member bore 57 and predeterminately less than the area $A_6$; therefore, it is obvious that the area $A_6$ is responsive to the applied fluid pressure at the outlet port 59, and the difference between areas $A_6$, $A_7$, i.e., $A_6-A_7$, is responsive to fluid pressure supplied to the inlet port 58 when the groove side wall 68 is engaged with the seal face 73. Opposed substantially equal effective areas $A_8$, $A_9$ are also provided on the valve member 84 substantially defined by the seating engagement thereof with the piston valve seat 82 and respectively subjected to the fluid pressure at the inlet and outlet ports 58, 59.

In the operation with the component parts of the control valve 51 in their inoperative or normal positions, as shown, input fluid pressure $P_1$ supplied to the inlet port 58 from the master cylinder (not shown) flows through the housing counterbore 54, the passage defined between the piston groove 66 and the valve member 70, the annular passage 62 and the housing bore 53 to establish an applied or output fluid pressure $P_2$ at the outlet port 59 in a predetermined 1:1 ratio with the input fluid pressure $P_1$ at said inlet port, as shown along the line OB in the graph of FIG. 3. The output fluid pressure $P_2$ initially acts on the effective area $A_7$ of the piston 60 to establish an initial closing or output force $P_2A_7$ urging said piston rightwardly against the compressive force Fs of the spring 79, and when the input and output fluid pressures $P_1$, $P_2$ are increased to the predetermined value B, as shown in the graph of FIG. 3, the initial output force $P_2A_7$ moves said piston rightwardly toward an isolating position disengaging the piston free end 78 from the end wall of the housing bore 53 and engaging the piston valve seat 68 with the valve member face 73 to isolate the input fluid pressure $P_1$ from the output fluid pressure $P_2$ and interrupt pressure fluid communication between the inlet and outlet ports 58, 59. With the piston valve seat 68 engaged with the valve member face 73, the output fluid pressure $P_2$ now acts on the effective area $A_6$ to establish another output force $P_2A_6$ which replaces the initial output force $P_2A_7$, and the input fluid pressure $P_1$ acts on the effective area $A_6-A_7$ to establish an input force $P_1(A_6-A_7)$ which is additive to the spring force Fs and opposed to the output force $P_2A_7$. When the input fluid pressure $P_1$ is increased along the line OC in the graph of FIG. 3 to values in excess of the predetermined value B but less than the predetermined value E, the input force $P_1(A_6-A_7)$ is correspondingly increased, and the increased input force $P_1(A_6-A_7)$ assisted by the spring force Fs urges the piston 60 leftwardly toward a metering position against the opposing output force $P_2A_6$. This leftward movement of the piston 60 disengages the valve seat 68 from the valve member face 73 to establish metered pressure fluid communication between the inlet and outlet ports 58, 59 and effect a metered increase in the output fluid pressure $P_2$ in another predetermined ratio with the input fluid pressure $P_1$ between the predetermined values B and E, as shown along the line BD in the graph of FIG. 3, said other ratio being defined by the following equation:

$$P_2 = \frac{P_1(A_6 - A_7) + Fs}{A_6}$$

The proportional increase in the output fluid pressure $P_2$ effects a corresponding increase in the output force $P_2A_6$ attains a value substantially equal to the opposing increased input force $P_1(A_6-A_7)$ and the additive spring force $Fs$, the piston 60 is again moved rightwardly to its isolating or interrupting position re-engaging the piston valve seat 68 with the valve member face 73 to again isolate the input and output fluid pressures $P_1$, $P_2$ and interrupt pressure fluid communication between the inlet and outlet ports 58, 59.

The input fluid pressure $P_1$ also flows from the housing counterbore 54 through the cross-passage 83 into the smaller stepped passage 81 of the piston 60 acting on the input area $A_8$ of the valve member 84 to establish an input force $P_1A_8$, and the output fluid pressure $P_2$ also flows from the housing bore 35 into the larger stepped passage 80 of said piston acting on the output area $A_9$ of said valve member to establish an output force $P_2A_9$ which is opposed to the input force $P_1A_8$ and additive to the compressive force $Fc$ of the spring 85. When the input fluid pressure $P_1$ is increased along the line OC in the graph of FIG. 3 to values in excess of the predetermined value E, the increased input force $P_1A_8$ urges the valve member 84 leftwardly against the additive output and spring forces $P_2A_9$ and $Fc$ toward a metering position disengaged from the piston valve seat 82 to establish metered pressure fluid communication between the inlet and outlet ports 58, 59 through the stepped passages 80, 81 when the piston 60 is in its isolating position. In this manner, the output fluid pressure $P_2$ is increased, as shown along the line DF in the graph of FIG. 3, in a predetermined 1:1 ratio with the input fluid pressure $P_1$ in excess of the predetermined value E, said predetermined ratio being illustrated by the following equation:

$$P_2 = \frac{P_1A_8 - Fc}{A_9}$$

This proportional increase in the output fluid pressure $P_2$ effects a corresponding increase in the output force $P_2A_9$, and when the increased output force $P_2A_9$ attains a value substantially equal to the additive input and spring forces $P_1A_8$ and $Fc$, the valve member 84 is moved rightwardly to its interrupting position re-engaging the piston valve seat 82 to again interrupt pressure fluid communication between the inlet and outlet ports 58, 59. When the output fluid pressure $P_2$ is increased in excess of the predetermined value D in response to input fluid pressures in excess of the predetermined value E, the increased output force $P_2A_6$ overcomes the additive input and spring forces $P_1(A_6-A_7)$ and $Fs$ urging the piston 60 and valve member 70 rightwardly in the housing bore and counterbores 53, 54 until the piston rightward free end 64 engages the end wall of the closure member bore 57.

When the desired braking effort is attained, the master cylinder is de-actuated to eliminate the input fluid pressure $P_1$, and when the input fluid pressure $P_1$ is so decreased along the line OC in the graph of FIG. 3 below the value of the output fluid pressure $P_2$ on the line DF of said graph, a fluid pressure differential is established across the valve member 70 which causes the sealing lip 72 thereof to collapse or displace from sealing engagement with the housing counterbore 54 thereby permitting the return flow of the displaced output fluid pressure from the outlet port 59 through the housing bore 53, the annular passage 62 and therefrom through the passage defined between the housing shoulder 55 and the valve element face 73 and past the displaced sealing lip 72 of the valve member 70 to the inlet port 58. This return flow of the displaced fluid pressure is illustrated along the line FGB in the graph of FIG. 3. When the input and output fluid pressures $P_1$, $P_2$ are so reduced to a value less than the predetermined value B, the reduced input force $P_1(A_6-A_7)$ and the additive spring force $Fs$ overcomes the reduced output force $P_2A_6$ and moves the piston 60 and valve member 70 to their original positions re-establishing open pressure fluid communication between the inlet and outlet ports 58, 59 through the passage defined between the piston groove 66 and the valve member 70.

Figure 8:
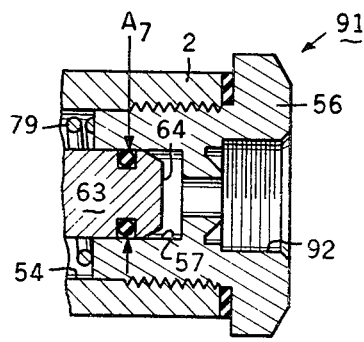
FIG. 8 is another fragmentary sectional view taken from FIG. 6 illustrating another control valve similar to the control valve of FIG. 6 also embodying the present invention in cross-section.

Referring now to FIG. 8, a control valve 91 is shown having the same component parts and functioning in the same manner as the previously described control valve 51 with the following exceptions.

In the control valve 91, a control or air spring port 92 is provided through the closure member 56 intersecting with the end wall of the closure member bore 57, said control port being adapted for connection with the air spring of a vehicle air suspension system (not shown), and the effective area $A_7$ of the piston stem 63 is subjected to the control or air spring fluid pressure $P_3$ at the control port 92.

In the operation of the control valve 91, it is obvious that, in the absence of control fluid pressure $P_3$ at the control port 92, the function of the control valve 91 is the same as that of the previously described control valve 51 as shown in FIG. 5. When the control fluid pressure $P_3$ is established at the control port 92 and acts on the area $A_7$ to establish a control force $P_3A_7$ which is additive to the input and spring forces $P_1(A_6-A_7)$ and $Fs$ to actuate the piston 60 to its metering position in opposition to the output force $P_2A_6$ and effect a proportional metered increase in the output fluid pressure $P_2$ along one of many incrementally variable lines parallel to the line BD, such as for instance the dashed line B'D' in the graph of FIG. 5, in the following ratio:

$$P_2 = \frac{P_1(A_6-A_7) + P_3A_7 + Fs}{A_6}$$

As the vehicle load is further increased, the control fluid pressure $P_3$ also increases to effect an increased control force $P_3A_7$, and such increases in the control force $P_3A_7$ are additive to the input and spring forces $P_1(A_6-A_7)$ and $Fs$ to establish a proportionally increased output fluid pressure $P_2$ in the same manner as described hereinabove and as illustrated, for instance, along the dashed line B''D'' in the graph of FIG. 5. From the foregoing, it is obvious that variations in the control fluid pressure $P_3$ not only proportionally alters the output fluid pressure $P_2$ but also alters the selected predetermined value B at which the proportioning function of the control valve 91 occurs, as well as the predetermined values E and D of the input and output fluid pressures $P_1$, $P_2$, respectively, at which said control valve functions to re-establish the 1:1 ratio between said input and output fluid pressures $P_1$, $P_2$. In other words, the output fluid pressure $P_2$ is proportionally variable with the vehicle load condition or magnitude in order to proportionally vary the braking effort of the vehicle with regard to the vehicle load.

From the foregoing, it is now apparent that novel control valves 1, 41, 51 and 91 meeting the objects set out hereinbefore, as well as other objects and advantageous features, are provided and that changes or modifications as to the precise configurations, shapes and details of the constructions set forth in the disclosure by way of illustration may be made by those skilled in the art without departing from the spirit of the invention.

The embodiments of the invention in which an exclusive property or privilege is claimed are defined as follows:

1. A control valve comprising a housing, a proportioning member movable in said housing for controlling the application of fluid pressure supplied thereto through said housing, resilient means normally urging said proportioning member toward a position in said housing establishing the applied fluid pressure in a predetermined ratio with the supplied fluid pressure, said proportioning member being initially movable in response to the supplied and applied fluid pressures of a predetermined value acting thereon against the force of said resilient means toward a position isolating the supplied and applied fluid pressures and being thereafter further movable in response to the force of said resilient means and increases in the supplied fluid pressure in excess of the predetermined value and less than another predetermined value greater than the first named predetermined value toward a metering position effecting a metered increase in the applied fluid pressure in another predetermined ratio with the increased supplied fluid pressure between the first named and other predetermined values, passage means in said proportioning member for connection between the supplied and applied fluid pressures when said proportioning member is in its isolating position, valve means movable in said proportioning member and controlling said passage means, and other resilient means normally urging said valve means toward a position closing said passage means, said valve means being movable against said other resilient means in response to further increases in the supplied fluid pressure in excess of the other predetermined value toward a metering position establishing metered pressure fluid communication through said passage means between the supplied and applied fluid pressures to effect a metered increase in the applied fluid pressure in substantially the first named predetermined ratio with the supplied fluid pressure in excess of the other predetermined value when said proportioning member is in its isolating position.

2. The control valve according to claim 1, comprising opposed areas on said proportioning member respectively subjected to the supplied and applied fluid pressures, said proportioning member being initially movable toward its isolating position when the supplied and applied fluid pressures acting on said opposed areas attain the first named predetermined value and said proportioning member being thereafter further movable in response to the supplied fluid pressure between the first named and other predetermined values acting on one of said opposed areas to effect the metered increase in the applied fluid pressure acting on the other of said opposed areas in the other predetermined ratio with the supplied fluid pressure between the first named and other predetermined values.

3. The control valve according to claim 2, wherein said other area is predeterminately greater than said one area.

4. The control valve according to claim 1, comprising inlet and outlet ports in said housing for respectively receiving the supplied and applied fluid pressures, other means in said housing defining a valve seat between said inlet and outlet ports, and other valve means on said proportioning member for engagement with said valve seat, and other valve means being disengaged from said valve seat when said proportioning member is in its first named position establishing open pressure fluid communication between said inlet and outlet ports and being movable into engagement with said valve seat to interrupt pressure fluid communication between said inlet and outlet ports upon movement of said proportioning member to its isolating position, and said other valve means being thereafter displaced from said valve seat to establish the metered pressure fluid communication between said inlet and outlet ports upon the movement of said proportioning member to its metering position.

5. The control valve according to claim 4, comprising return flow passage means in said proportioning member for connection in pressure fluid communication between said inlet and outlet ports, said other valve means including a portion defining uni-directional valve means controlling pressure fluid flow through said return flow passage means, said uni-directional valve means being movable toward a position permitting only the return flow of the displaced applied fluid pressure through said return flow passage means from the outlet port to the inlet port in the event the magnitude of the supplied fluid pressure is reduced below that of the applied fluid pressure when said other valve means is engaged with said valve seat.

6. The control valve according to claim 4, comprising a bore in said housing aligned with a pair of stepped counterbores, said inlet and outlet ports being respectively connected with the smaller and the larger of said stepped counterbores, said other means including a shoulder on said housing between said smaller and larger stepped counterbores and said valve seat being on said shoulder, an abutment on said housing in said larger stepped counterbore and spaced from said shoulder, said proportioning member including a piston extending through said smaller stepped counterbore and having opposed ends, one of said opposed ends being slidable in said housing bore and the other of said opposed ends being disposed in said larger stepped counterbore, said resilient means including a spring biased between said housing shoulder and said piston, and said spring normally urging said piston toward its first named position engaging said other opposed end thereof with said abutment, annular flange means on said piston between said one and other opposed ends in said larger stepped counterbore and spaced from said valve seat, and said other valve means being on said annular flange means.

7. The control valve according to claim 1, comprising opposed areas on said valve means respectively subjected to the supplied and applied fluid pressures, said valve means being movable toward its metering position in said passage means against the force of said other resilient means and the force of the applied fluid pressure acting on one of said areas in response to the supplied fluid pressure in excess of the other predetermined value acting on the other of said areas to establish the metered pressure fluid communication through said passage means between the supplied and applied fluid pressures and effect the metered increase in the applied fluid pressure in substantially the first named predetermined ratio with the supplied fluid pressure in excess of the other predetermined value.

8. The control valve according to claim 1, comprising a valve seat on said proportioning member about said passage means, said other resilient means normally urging said valve means into engagement with said valve seat, said valve means being movable against said other resilient means in response to the supplied fluid pressure in excess of the other predetermined value toward its metering position disengaged from said valve seat.

9. The control valve according to claim 4, wherein said passage means includes a pair of stepped bores in said piston respectively connected in pressure fluid communication with said inlet and outlet ports, another shoulder on said piston at the juncture of said stepped bores defining another valve seat, another abutment in said larger stepped bore and spaced from said shoulder, said first named valve means being movable in said larger stepped bore between said other valve seat and other abutment, said other resilient means including a spring biased between said first named valve means and other abutment and normally urging said first named valve means into engagement with said other valve seat to interrupt pressure fluid communication through said stepped bores between said inlet and outlet ports, and opposed substantially equal areas on said first named valve means respectively subjected to the supplied and applied fluid pressures at said inlet and outlet ports, said first named valve means being movable against said spring and the force of the applied fluid pressure acting on one of said areas in response to the supplied fluid pressure in excess of the other predetermined value acting on the other of said areas toward its metering position disengaged from said other valve seat to establish the metered pressure fluid communication through said stepped bores between said inlet and outlet ports and effect the metered increase in the applied fluid pressure at said outlet port in substantially the first named predetermined ratio with the supplied fluid pressure in excess of the other predetermined value at said inlet port.

10. The control valve according to claim 6, comprising return flow passage means in said piston and extending through said flange means, and said other valve means including an annular valve element having opposed faces, and a central aperture connected between said opposed faces and received on said piston, one of said opposed faces being engaged with said valve seat when said proportioning member is in its isolating position and the other of said opposed faces being normally engaged with said flange means to close said return flow passage means, said other opposed face being disengaged from said flange means to open said return flow passage means and permit only the return flow of the displaced applied fluid pressure therethrough from said outlet port to said inlet port in the event the magnitude of the supplied fluid pressure is reduced below that of the applied fluid pressure when said one opposed face is engaged with said valve seat.

11. The control valve according to claim 1, comprising a valve seat on said proportioning member about said passage means, said other resilient means including a spring engaged between said proportioning member and said valve means normally urging said valve means into engagement with said valve seat closing said passage means, and opposed areas on said valve means for respective subjection to the supplied and applied fluid pressures, said valve means being movable against the force of said spring and the applied fluid pressure acting on one of said opposed areas toward its metering position disengaged from said valve seat in response to the supplied fluid pressure in excess of the other predetermined value acting on the other of said opposed areas.

12. The control valve according to claim 1, comprising annular sealing means in said housing about said proportioning member and defining with said housing a pressure fluid flow passage for the application of the supplied fluid presure therethrough, other valve means on said proportioning member for engagement with said sealing means, said other valve means being movable into engagement with said sealing means to close said flow passage upon the movement of said proportioning member from its first named position to its isolating position and said other valve means being disengaged from said sealing means to open said flow passage and establish metered pressure fluid communication therethrough between the supplied and applied fluid pressures upon the movement of said proportioning member to its metering position.

13. The control valve according to claim 12, comprising another valve seat on said sealing means about said flow passage for engagement with said other valve means when said proportioning member is in its isolating position.

References Cited
UNITED STATES PATENTS

| | | | |
|---|---|---|---|
| 3,360,004 | 12/1967 | Lewis et al. | 137—493 |
| 3,375,852 | 4/1968 | Milster | 303—6 X |
| 3,385,637 | 5/1968 | Kersting | 303—6 |
| 3,403,944 | 10/1968 | Thirion | 303—6 |
| 3,410,090 | 11/1968 | Thirion | 303—6 X |

FERGUS S. MIDDLETON, Primary Examiner

J. J. McLAUGHLIN, Jr. Assistant Examiner

U.S. Cl. X.R.

60—54.5; 137—493.6, 493.9; 188—152; 303—22